(12) United States Patent
Horiuchi et al.

(10) Patent No.: US 7,791,840 B2
(45) Date of Patent: Sep. 7, 2010

(54) HEAD SUSPENSION, LOAD BEAM, AND METHOD OF MANUFACTURING LOAD BEAM

(75) Inventors: Takashi Horiuchi, Yokohama (JP); Takumi Karasawa, Yokohama (JP)

(73) Assignee: NHK Spring Co., Ltd., Kanagawa-Ken (JP)

( * ) Notice: Subject to any disclaimer, the term of this patent is extended or adjusted under 35 U.S.C. 154(b) by 869 days.

(21) Appl. No.: 11/709,021

(22) Filed: Feb. 21, 2007

(65) Prior Publication Data

US 2007/0193024 A1    Aug. 23, 2007

(30) Foreign Application Priority Data

Feb. 21, 2006    (JP)    ............................... 2006-043412

(51) Int. Cl.
G11B 5/127    (2006.01)
(52) U.S. Cl. .................................................... 360/245
(58) Field of Classification Search ................. 360/245; 29/603.07
See application file for complete search history.

(56) References Cited

U.S. PATENT DOCUMENTS

| | | | | |
|---|---|---|---|---|
| 5,844,751 A | * | 12/1998 | Bennin et al. ............ | 360/244.3 |
| 6,760,196 B1 | * | 7/2004 | Niu et al. ................. | 360/294.6 |
| 6,790,133 B2 | * | 9/2004 | Nuno ......................... | 451/318 |
| 7,230,798 B2 | * | 6/2007 | Hashi et al. .............. | 360/244.2 |
| 7,606,002 B1 | * | 10/2009 | Berscheit et al. ........ | 360/245.1 |
| 2006/0209466 A1 | * | 9/2006 | Ono et al. ................ | 360/245.7 |

FOREIGN PATENT DOCUMENTS

| | | |
|---|---|---|
| JP | 51-92341 | 1/1975 |
| JP | 61-273226 | 12/1986 |
| JP | 07-112213 | 5/1995 |
| JP | 2005-116129 | 4/2005 |
| JP | 2005-166203 | 6/2005 |

\* cited by examiner

*Primary Examiner*—Allen T Cao
(74) *Attorney, Agent, or Firm*—Jordan and Hamburg LLP

(57) ABSTRACT

In the manufacture of a load beam for reading and writing a hard disk in a hard disk drive which load beam has a body having a slope extending from a front end thereof and bent along a bend line in a direction opposite to the hard disk, a tab protruding from the slope and to be guided on a guide of the hard disk drive, and a box-bent portion extending along each side edge of the body and slope and passing through an end of the bend line. A first stage is preparing a load beam material that is flat and has a deformation control zone on a section to be processed into the box-bent portion of the load beam material corresponding to the section to be processed into the bend line so as to prevent the box-bent portion from deforming and protruding when the box-bent portion is formed.

21 Claims, 5 Drawing Sheets

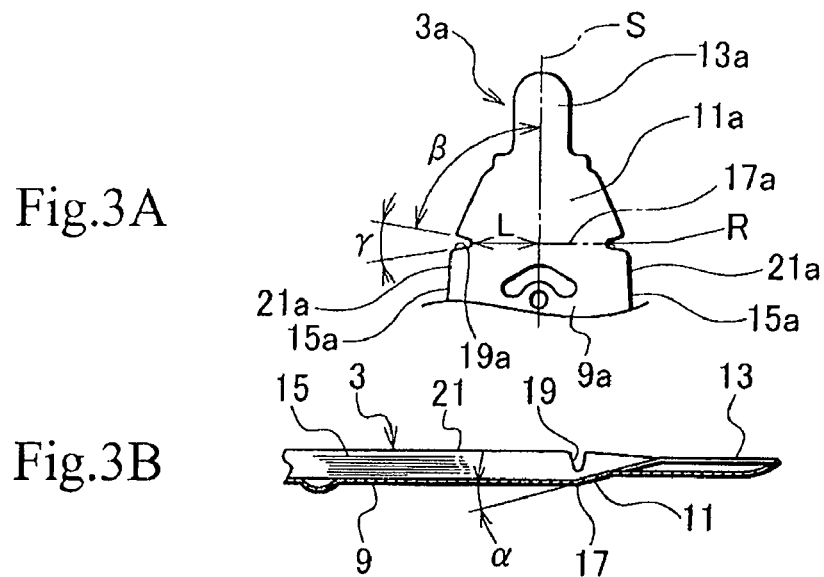
Fig.3A
Fig.3B
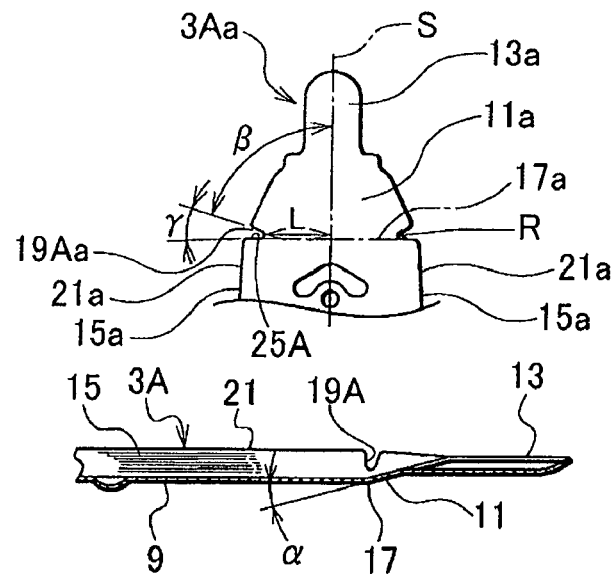
Fig.4A
Fig.4B
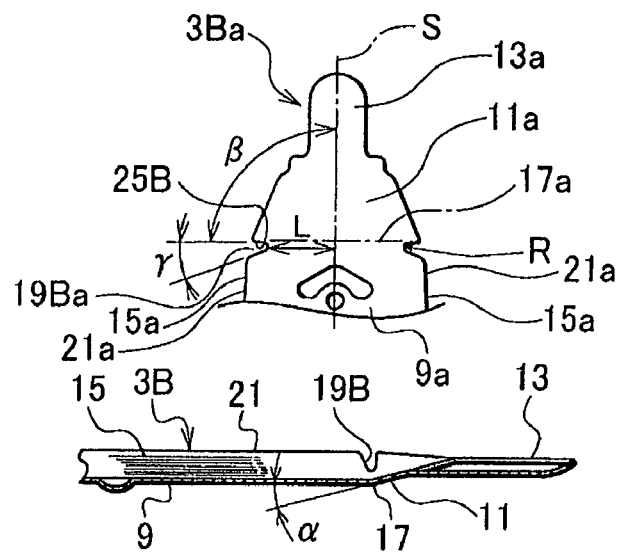
Fig.5A
Fig.5B

| Burr (→With deformation control zone) | ○ | △→○ | △→○ | ×→△ | ×→△ | ×→× |
|---|---|---|---|---|---|---|
| Projection (→With deformation control zone) | ○ | ○ | △→○ | ×→○ | ×→△ | ×→× |
| Collapsed area (×10⁻³mm²) (→With deformation control zone) | 2.79 | 3.99→1.44 (Rounded 55%) | 6.08→1.19 (Recess 60%) | 8.30→3.19 (Recess 30%) | 6.57→2.49 (Rounded 55%) | 9.30→7.71 (Recess 20%) |
| | 8° | 14° | 15° | 19° | 26° | 32° |

| Recess area | | Slope angle | | |
|---|---|---|---|---|
| [ % ] | [ mm ] | 8 deg. | 15 deg. | 26 deg. |
| 100 | 0.175 | 855.44 | 833.19 | 817.30 |
| 77 | 0.135 | 853.10 | 829.07 | 812.88 |
| 66 | 0.115 | 849.04 | 825.59 | 807.03 |
| 54 | 0.095 | 840.92 | 814.98 | 800.01 |
| 43 | 0.075 | 825.04 | 795.46 | 781.60 |
| 21 | 0.055 | 792.52 | 757.23 | 745.01 |
| 20 | 0.035 | 733.45 | 690.77 | 685.40 |
| 0 | 0 | 510.42 | 495.36 | 516.96 |

HEAD SUSPENSION, LOAD BEAM, AND METHOD OF MANUFACTURING LOAD BEAM

BACKGROUND OF THE INVENTION

1. Field of the Invention

The present invention relates to a head suspension and a load beam for supporting a slider that reads and writes data to and from a hard disk in a hard disk drive installed in an information processor such as a personal computer. The present invention also relates to a method of manufacturing the load beam.

2. Description of Related Art

A hard disk drive used for an information processor such as a personal computer incorporates a hard disk that is read and written with a slider attached to a head of a head suspension. The hard disk is rotated at high speed and the slider is slightly raised from the surface of the hard disk and is moved across tracks of the hard disk, to write and read data to and from the hard disk through a transducer. The slider is attached to the head suspension so that the slider may float off the surface of the hard disk. The head suspension includes a load beam to apply load onto the head including the slider.

The hard disk drive usually employs a load-unload technique to retract the slider out of the tracks of the hard disk when the hard disk is stopped.

The load-unload technique otherwise known as a ramp-load technique employs a ramp block made of synthetic resin and arranged at a side of the hard disk. When the hard disk is stopped, the head suspension is moved to a retract position. At this time, a tab corresponding to a guided portion (also called as a load bar, ramp contact, corner, and the like) formed at a front end of the load beam of the head suspension slides along a slope of the ramp block, to separate the slider away from the hard disk.

The head suspension must be light to improve antishock performance and the load beam must be thin to reduce the weight of the head suspension. To meet these requirements, the rigidity of the tab formed at the front end of the load beam tends to be decreased.

The rigidity of the tab, however, must be maintained even if the load beam is made thinner. For this, Japanese Unexamined Patent Application Publication No. 2005-166203 discloses a technique of extending a box-bent portion formed along each side edge of the load beam to the tab protruding from the front end of the load beam.

This related art, however, causes an outward projection to be formed at a portion of the load beam making the transition to the tab side when forming the box-bent portion. The outward projection interferes with a metal mold and produces droppable burrs due to the interferer. The droppable burrs may damage a hard disk drive in which a head suspension having the load beam is installed. A cause of the outward projection results the structure of the load beam consisting of a body, a slope formed by bending a front portion of the body along a bend line, and the tab extending from the slope. Accordingly, when each edge of the load beam up to the slope is box-bent, a portion of the box-bent portion corresponding to the edge at the bend line deforms to cause the outward projection (excessive projection) due to material surplus.

A similar related art will be found in Japanese Unexamined Patent Application Publication No. 2005-116129.

SUMMARY OF THE INVENTION

An object of the present invention is to manufacture a load beam without causing excessive projections and burrs when processing each edge of the load beam into a box-bent shape.

In order to accomplish the object, an aspect of the present invention provides a method of manufacturing a load beam that is installed in a hard disk drive to read and write a hard disk. The load beam has a body, a slope extending from a front end of the body and bent along a bend line in a direction opposite to the hard disk, a guided portion protruding from the slope and to be guided on a guide of the hard disk drive, and a box-bent portion extending along each side edge of the body and the slope and passing through an end of the bend line. The method includes preparing a load beam material having sections to be processed into the body, slope, guided portion, and box-bent portions of the load beam; forming a deformation control zone on the section to be processed into box-bent portions corresponding to the section to be processed into the bend line so as to prevent the box-bent portion from deforming and protruding when the box-bent portion is formed; and processing the load beam material provided with the deformation control zones into the load beam having the body, slope, guided portion, and box-bent portions.

The method according to this aspect is capable of preventing the occurrence of the material surplus at a portion of the box-bent portion corresponding to the bend line during the box-bend process by forming the deformation control zones on the load beam material.

BRIEF DESCRIPTION OF THE DRAWINGS

FIG. 3A is a plan view partly showing a load beam material prepared according to the first embodiment;

FIG. 3B is a sectional side view showing a load beam formed from the load beam material of FIG. 3A;

FIG. 4A is a plan view partly showing a load beam material of a modified example prepared according to the first embodiment of the present invention;

FIG. 4B is a sectional side view showing a load beam formed from the load beam material of FIG. 4A;

FIG. 5A is a plan view partly showing a load beam material of another modified example prepared according to still another embodiment of the present invention;

FIG. 5B is a sectional side view showing a load beam formed from the load beam material of FIG. 5A;

DETAILED DESCRIPTION OF THE INVENTION

Embodiments of the present invention employing deformation control zones to prevent material surplus during the formation of box-bent portions of a load beam will be explained.

Firs, a head suspension having a load beam produced according to a manufacturing method according to the first embodiment of the present invention will be explained.

Figure 1:
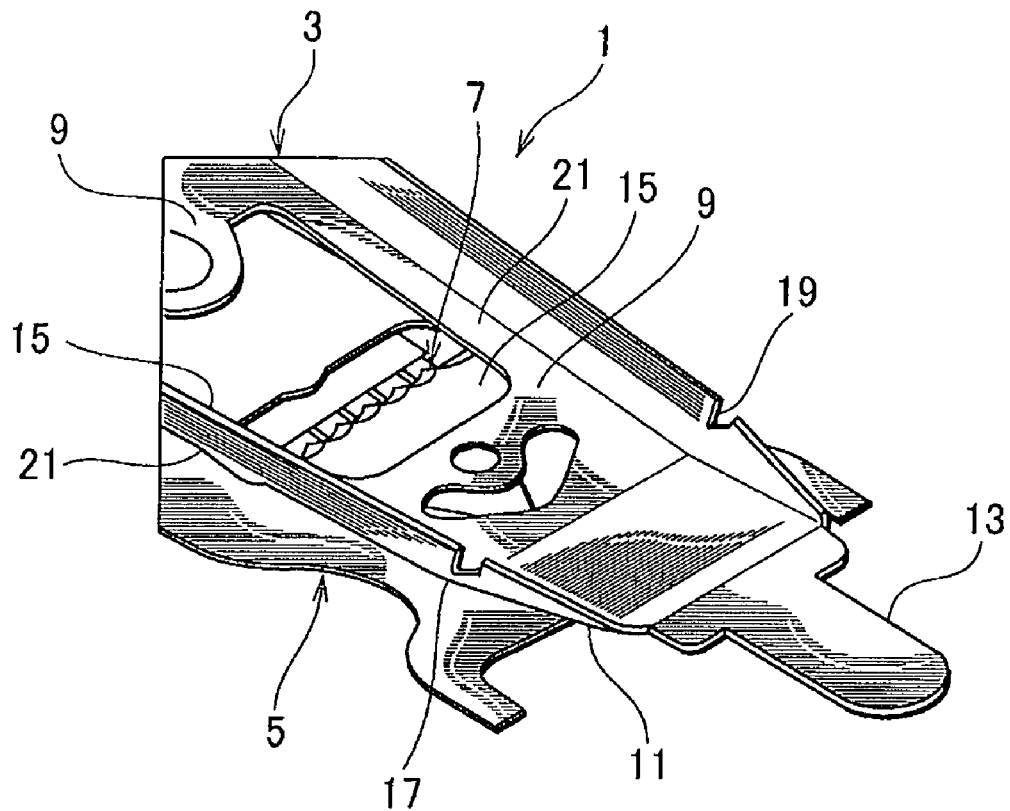
FIG. 1 is a perspective view partly showing a head suspension based on the load-unload technique, according to a first embodiment of the present invention.
Figure 2:
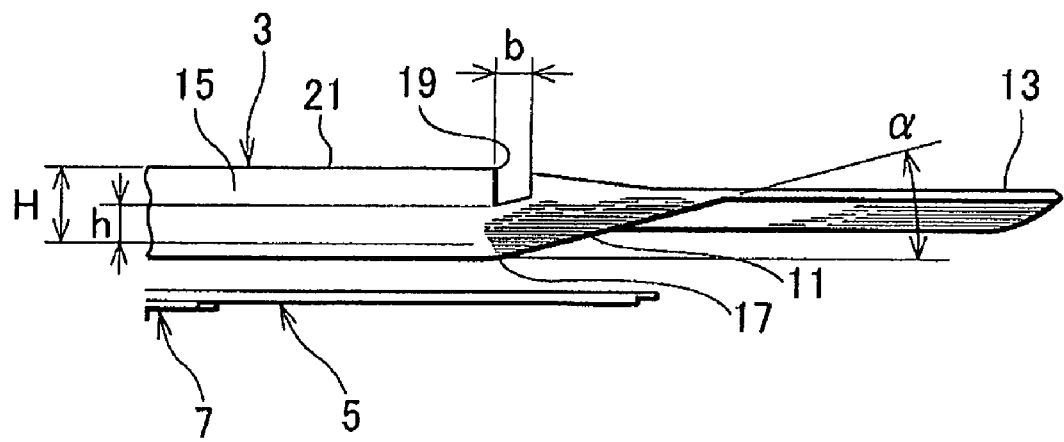
FIG. 2 is a side view showing the part of the head suspension of FIG. 1.

FIG. 1 is a perspective view partly showing a head suspension based on the load-unload technique, according to the first embodiment of the present invention and FIG. 2 is a side view showing the part of the head suspension of FIG. 1.

In FIGS. 1 and 2, the head suspension 1 includes a load beam 3 produced according to a manufacturing method according to the first embodiment of the present invention. The load beam 3 is made of a precision thin plate of, for example, stainless steel and includes a resilient part. The head suspension 1 has a flexure 5 that is made of a very thin resilient plate of, for example, stainless steel and is fixed to the load beam 3 by, for example, laser welding. The flexure 5 is provided with a head 7 including a slider (not shown). The load beam 3 has a base plate (not shown) that is fixed to an arm of a carriage (not shown) arranged in a hard disk drive (not shown).

The load beam 3 is made of, for example, austenitic stainless steel such as SUS304 (Japanese industrial standard) and SUS301 (Japanese industrial standard). SUS304 contains C of 0.08% or below, Si of 1% or below, Mn of 2% or below, P of 0.04% or below, S of 0.03% or below, Ni of 8 to 10.5%, Cr of 18 to 20%, Fe of the remaining part.

The load beam 3 includes a body 9, a slope 11, a tab 13 corresponding to a guided portion, and a box-bent portion 15.

The body 9 is flat and has a bend line 17 at a front portion thereof. The slope 11 is bent along the bend line 17 at an angle of a in a direction away from a hard disk. The angle a stretches between the slope 11 and the body 9. The tab 13 outwardly extends and protrudes from a front end of the slope 11 in a longitudinal direction of the load beam 3, to be guided along a guide that is arranged in the hard disk drive by sliding. The box-bent portion 15 is formed along each side edge of the body 9 and the slope 11 and passes through an end of the bend line 17. The box-bent portions 15 reinforce the slope 11, to thereby reinforce a base of the tab 13 supported by the slope 11.

The box-bent portions 15 improve the rigidity of the thin load beam 3, as well as the rigidity of the tab 13.

Each box-bent portion 15 has a recess 19 at a portion corresponding an end of the bend line 17. The recess 19 corresponds to a deformation control zone 19a to be explained later. The deformation control zone 19a becomes the recess 19 when a load beam material is processed into the load beam 3. It is possible that the deformation control zone 19a disappears without forming the recess 19 on the completion of the load beam 3.

In FIGS. 1 and 2, the recess 19 expands so as to cross over each side of the bend line 17 and has a width b on the edge 21 of the box-bent portion 15 in the longitudinal direction of the load beam 3. The box-bent portion 15 has a height H in a thickness direction of the load beam 3 at a location where no recess is formed and a height h at a location where the recess 19 is formed in the thickness direction, as shown in FIG. 2. Namely, the depth of the recess 19 in the height direction of the box-bent portion 15 is the difference between H and h.

Next, the manufacturing method according to the first embodiment will be explained.

FIG. 3A is a plan view partly showing a load beam material 3a prepared according to the first embodiment and FIG. 3B is a sectional side view showing the load beam 3 formed from the load beam material 3a of FIG. 3A.

The load beam 3 is manufactured through a preparatory stage and a formation stage.

In FIG. 3A, the load beam material 3a is flat and has a body section 9a, a slope section 11a, a tab section 13a, and a box-bent section 15a integrally corresponding to the body 9, slope 11, tab 13, and box-bent portion 15 of the load beam 3, respectively, as shown in FIG. 3B. The load beam material 3a may be made from a flat plate by pressing or etching. In FIG. 3A, a corresponding line (section) 17a to be processed into the bend line 17 that is a portion intersecting a line along the body 9 with a line along the slope 11 of FIG. 3B is represented as a dot-and-dash line. In the preparatory stage, the deformation control zone 19a is simultaneously formed on the box-bent section 15a of the load beam material 3a corresponding to the corresponding line 17a. Namely, the deformation control zone 19 is formed in an adjacent portion of the box-bent section 15a adjacent to each end of the corresponding line 17a of the load beam material 3a, as shown in FIG. 3A. The deformation control zone 19a functions to prevent excessive projection of the box-bent section 15a during the formation stage and becomes the recess 19 of the finished load beam 3.

The deformation control zone 19a is a cutout corresponding to a cut zone formed by cutting away the adjacent portion of each end of the line 17a from the box-bent section 15a so as to inwardly hollow the box-bent section 15a in an across-the-width direction of the load beam material 3a. The deformation control zone 19a has a triangle shape (wedge shape) whose base is on the side edge 21a. The deformation control zone 19a has a predetermined area expanding in the body section 9a side and slope section 11a side along the surface of the load beam material 3a. Namely, the deformation control zone 19a is present across the line 17a. The size of the deformation control zone 19a is determined around a center line S of the body section 9a. An angle β from the center line S defines an open angle γ of the triangular deformation control zone 19a, and a distance L is set from the center line S to the apex of the deformation control zone 19a.

In the formation stage, the load beam material 3a is pressed into the load beam 3 having the body 9, slope 11, tab 13, and box-bent portions 15, as shown in FIG. 3B. During the formation stage, the deformation control zone 19a prevents material surplus of the box-bent portion 15.

Namely, a portion of the box-bent portion 15 between the body 9 and the slope 11 never protrudes in an across-the-width direction of the load beam 3, i.e., a rotational direction of the hard disk, during and after the formation stage. As a result, no projections interfere with a metal mold for pressing the load beam material 3a into the load beam 3, so that no droppable burrs are produced due to interfering the projections with the metal mold.

In the formation stage, the slope 11, tab 13, and box-bent portions 15 may be formed through different processes on the load beam material 3a.

Next, the optimization of a deformation control zone will be explained.

FIG. 4A is a plan view partly showing a load beam material 3Aa of a modified example prepared according to the first embodiment of the present invention and FIG. 4B is a sectional side view showing a load beam 3A formed from the load beam material 3Aa of FIG. 4A. FIG. 5A is a plan view partly showing a load beam material 3Ba of another modified example prepared according to the first embodiment of the present invention and FIG. 5B is a sectional side view showing a load beam 3B formed from the load beam material 3Ba of FIG. 5A.

In FIGS. 4A and 5A, deformation control zone 19Aa and 19Ba are different from the deformation control zone 19 of FIG. 3A in position.

In FIG. 4A, the load beam material 3Aa is flat and has a deformation control zone 19Aa that is mainly in the area of a slope section 11a with one side 25A of the deformation control zone 19Aa being on a bend line 17a. In FIG. 5A, the load beam material 3Ba is flat and has a deformation control zone 19Ba that is mainly in the area of a body 9a with one side 25B of the deformation control zone 19Ba being on a bend line 17a.

Each of the examples shown in FIGS. 3A to 4B prevents the box-bent portions 15 from protruding. The example of FIGS. 5A and 5B may cause slight projection of the box-bent portions 15 to interfere with a metal mold. Compared with the related art that employs no deformation control zone, the example of FIGS. 5A and 5B is still capable of suppressing the production of droppable burrs.

It is preferable to form the deformation control zone 19 (19Aa) in the area of the slope 11 (11a) including the bend line 17 (17a) as shown in FIGS. 3A to 4B.

Figures 6, 7:
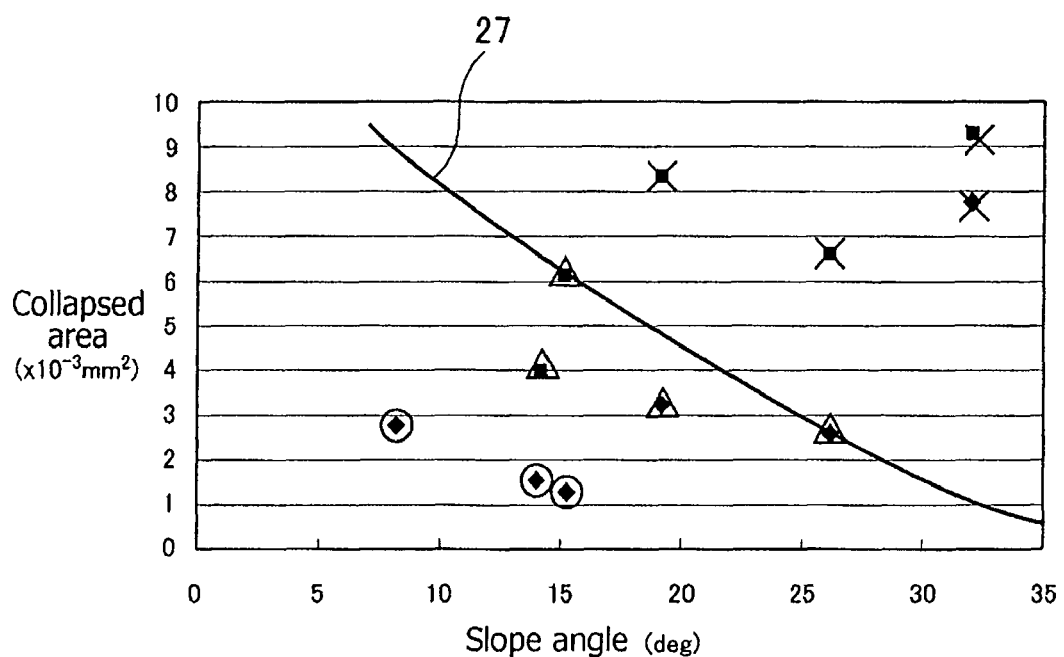
FIG. 6 is a table showing the size of excessive projections and the occurrence of burrs on load beams with respect to different slope angles and collapsed areas due to material surplus with or without a deformation control zone according to the first embodiment of the present invention.
FIG. 7 is a graph showing evaluation result of the size of excessive projections and the occurrence of burrs according to the first embodiment of the present invention.

FIG. 6 is a table showing the size of excessive projections and the occurrence of burrs on load beams with respect to different slope angles and collapsed areas due to material surplus with or without a deformation control zone.

In FIG. 6, burrs occur when an excessive projection of the box-bent portion 15 formed by material surplus interferes with a metal mold and is droppable. The excessive projection is formed when the box-bent section 15a is bent into the box-bent portion 15. A collapsed area in the table of FIG. 6 is calculated by multiplying a length reduction in the edge 21 of the box-bent portion 15 due to deformation by the wall thickness of the box-bent portion 15, when there is no deformation control zone. If there is a deformation control zone, the collapsed area is calculated by multiplying a length reduction at the apex of the triangular recess 19 (19A, 19B) by the wall thickness of the box-bent portion 15.

In FIG. 6, the angle α of the slope 11 is changed to 8, 14, 15, 19, 26, and 32 degrees, and at each angle, the collapsed area ($\times 10^{-3}$ mm$^2$) with or without the deformation control zone is measured. In each case, a circle mark indicates that substantially no projection or burr is observed, a triangle mark indicates that substantially no projection is observed but some scratches are observed, and a cross mark indicates that large projections and burrs are observed. Each case with the circle or triangle mark is evaluated as acceptable (OK) and each case with the cross mark as unacceptable (NG).

For example, a sample with a slope 11 having an angle α of 26 degrees without the deformation control zone causes a collapsed area of 6.57 and is evaluated as NG in terms of burr and projection. The same sample but with the deformation control zone causes a collapsed area of 2.49 and is evaluated as OK because it has a triangle mark in each of the bur and projection cells.

FIG. 7 is a graph plotted with the data shown in FIG. 6. The graph represents evaluation results of the size of excessive projections and the occurrence of burrs according to the first embodiment. An abscissa indicates a slope angle and an ordinate indicates a collapsed area.

In FIG. 7, a curve 27 is depicted by connecting border triangle marks, i.e., acceptable limits close to cross marks.

It is understood from FIGS. 6 and 7 that the angle α of the slope 11 relative to the load beam body 9 must preferably be 26 degrees or smaller, more preferably 15 degrees or smaller.

Figures 8, 9:
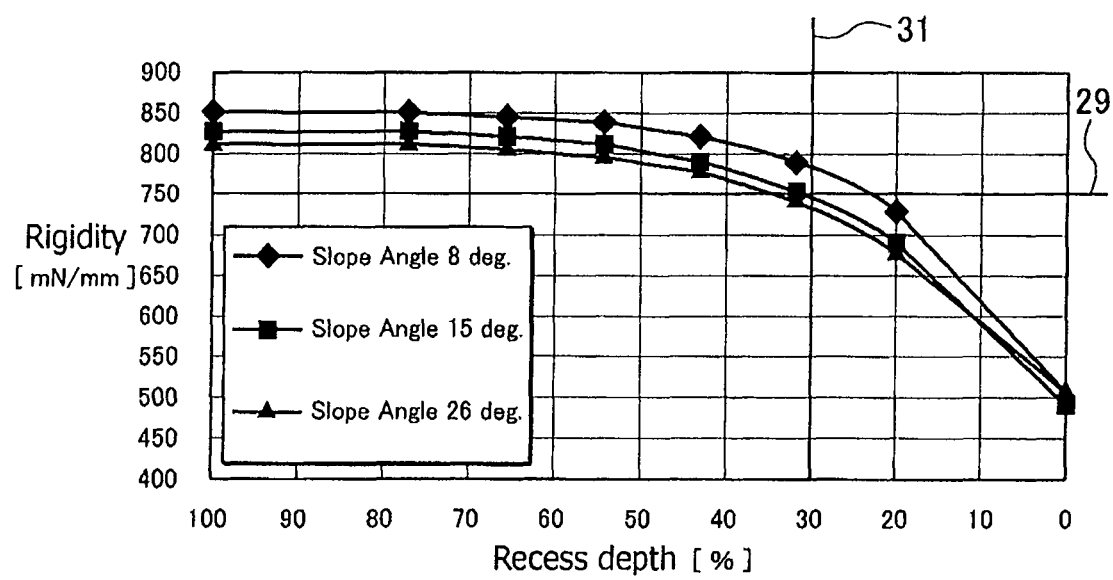
FIG. 8 is a table showing a relationship between the rigidity of a load beam and the depth of a deformation control zone according to the first embodiment with different slope angles.
FIG. 9 is a graph showing a relationship between the rigidity of a load beam and the depth of a deformation control zone according to the first embodiment with different slope angles.

FIG. 8 is a table showing a relationship between the rigidity of a load beam and the depth of a deformation control zone and FIG. 9 is a graph plotted with the data shown in FIG. 8.

In FIGS. 8 and 9, a recess depth is equal to the difference between H and h shown in FIG. 2 and a percentage is equal to h divided by H multiplied by 100. A recess depth of 100% means that there is no recess and a recess depth of 0% means that the recess depth is equal to H, i.e., h is zero. The angle α of the slope 11 is changed to 8, 15, and 26 degrees. Rigidity-recess depth curves of FIG. 9 show similarity among the different angles.

Generally, in a typical head suspension, a load of 2.5 g works on a dimple of a head of the head suspension. When a tab (13 of FIG. 1) of the head suspension is moved onto a ramp block to unload, the load of 2.5 g will act on the tab.

To prevent the deformation of a slope (11 of FIG. 1) that supports the tab, the slope must have a rigidity of 300 mN/mm for one-gram load. For the typical load of 2.5 g, the slope must have a rigidity of 750 mN/mm.

In FIG. 9, the rigidity of 750 mN/mm corresponds to a straight line 29. A straight line 31 in FIG. 9 corresponds to the h/H percentage of 30% with H being the height of the box-bent portion 15 and h being the difference between the height H and the depth of the recess 19, as shown in FIG. 2. As is apparent from FIG. 9, it is preferable that the h/H percentage is equal to or larger than 30%. The depth of the recess 19 (19A, 19B) also means the depth of the deformation control zone 19a (19Aa, 19Ba).

Effect of the first embodiment of the present invention will be explained.

The method according to the first embodiment includes the preparatory stage and formation stage. The preparatory stage prepares the load beam material 3a that is flat and has the body section 9a, slope section 11a, tab section 13a, and box-bent section 15a corresponding to the body 9, slope 11, tab 13, and box-bent portion 15 of the load beam 3, respectively. The preparatory stage forms the deformation control zone 19a (19Aa, 19Ba) in an adjacent portion of the box-bent section 15a adjacent to each end of the line 17a to prevent projection of the box-bent section 15a at the end of the line 17a during the formation stage.

The first embodiment suppress the excessive projections of the box-bent section 15a during a press process in the formation stage, thereby preventing the production of droppable burrs that may damage a hard disk drive in which the head suspension is installed to cause malfunctions.

The deformation control zone 19a (19Aa, 19Ba) is easy to form on each side edge of the box-bent section 15a.

The deformation control zone 19a (19Aa, 19Ba) has a triangle shape whose base is on the side edge of the box-bent section 15a. The triangle shape is advantageous in preventing an excessive projection of the box-bent section 15a due to material surplus and in easily shaping the box-bent portion 15 around each end of the bend line 17.

In the case of forming deformation control zone 19a (19Aa) in the area including the slope section 11a side and the corresponding line 17a, to secure the rigidity of the load beam 3 and prevent the occurrence of excessive projections and burrs.

The first embodiment sets the h/H percentage to 30% or larger, where H is the height of the box-bent portion 15 and h is the difference between the height H and the depth of the recess (deformation control zone) 19 (19A, 19B, 19a, 19Aa, 19Ba), to secure the rigidity of the slope 11 and tab 13 of the load beam 3 and maintain a correct load-unload operation.

The first embodiment sets the angle α of the slope 11 relative to the load beam body 9 to 26 degrees or smaller, to prevent the occurrence of projections and burrs.

The load beam 3 according to the first embodiment has no excessive projections or burrs and provides a high-quality head suspension 1.

The head suspension 1 with the load beam 3 of the first embodiment secures high quality and causes no malfunctions due to drops of burrs after installed in a hard disk drive.

Figure 10A:
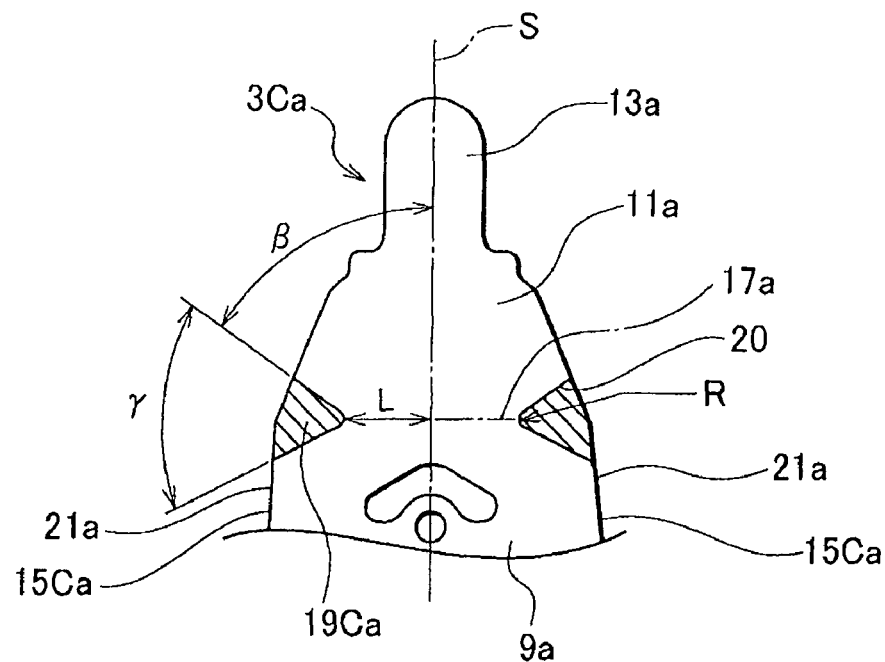
FIG. 10A is a plan view partly showing a load beam material prepared according to a second embodiment of the present invention.
Figure 10B:
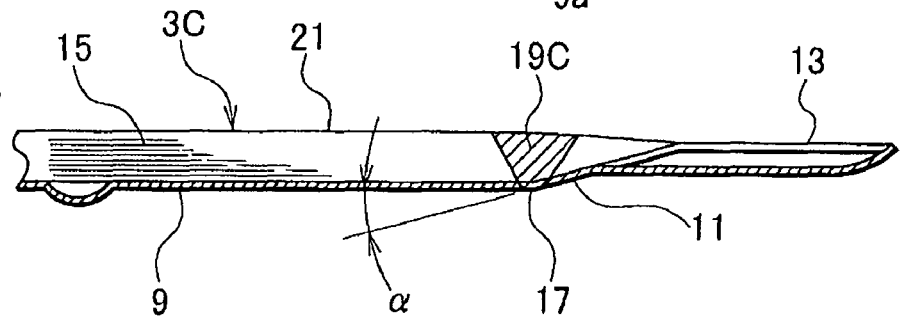
FIG. 10B is a sectional side view showing a load beam formed from the load beam material of FIG. 10A.

FIG. 10A is a plan view partly showing a load beam material prepared according to a second embodiment of the present invention and FIG. 10B is a sectional side view showing a load beam formed from the load beam material of FIG. 10A. Parts corresponding to those of FIGS. 1 and 2 are represented with the same reference numerals or the same reference numerals plus "C."

The load beam 3C according to the second embodiment is formed through a preparatory stage and a formation stage like the first embodiment.

In FIG. 10A, the second embodiment employs a deformation control zone 19Ca that is thin portion 19C corresponding to a thinned zone defined concave portion 20 formed on a box-bent section 15Ca and has a triangle shape whose base is on a side edge of a box-bent section 15Ca. The deformation control zone 19Ca is formed by half-etching. Conditions for optimizing the deformation control zone 19Ca are substantially the same as those of the first embodiment.

Figure 11:
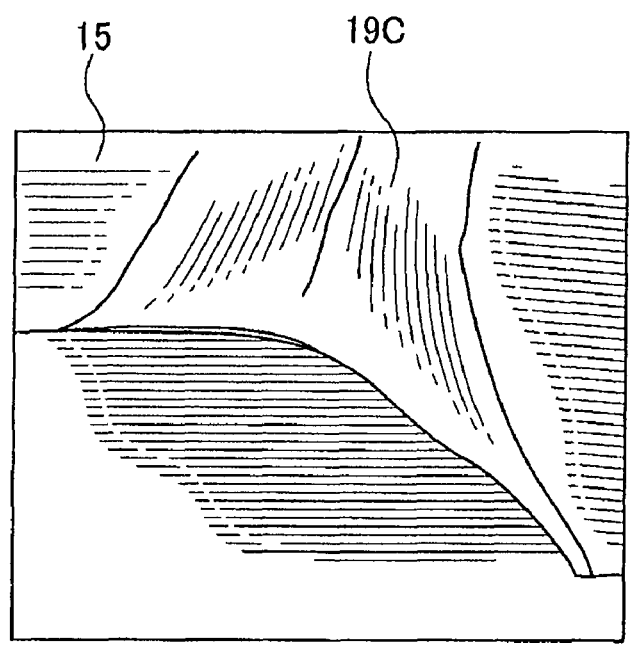
FIG. 11 is an enlarged model partly showing a load beam produced by pressing the load beam material of FIG. 10A.

FIG. 11 is an enlarged model showing the load beam 3C produced by pressing the load beam material 3Ca of FIG. 10A.

When pressed, the deformation control zone 19Ca of FIG. 10A inwardly collapses in a width direction of the load beam 3C into a dented thin portion 19C to provide the same effect as the first embodiment.

Even if the thin portion 19C outwardly protrudes in a width direction of the load beam 3C, the projection will not strongly interfere with a metal mold because the portion 19C is very thin.

What is claimed is:

1. A method of manufacturing a load beam that is installed in a hard disk drive to read and write a hard disk, the load beam having a body, a slope extending from a front end of the body and bent along a bend line in a direction opposite to the hard disk, a guided portion protruding from the slope and to be guided on a guide of the hard disk drive, and a box-bent portion extending along each side edge of the body and the slope and passing through an end of the bend line, the method comprising:

preparing a load beam material having sections to be processed into the body, slope, guided portion, and box-bent portions of the load beam;

forming a deformation control zone on the section to be processed into the box-bent portion of the load beam material corresponding to the section to be processed into the bend line so as to prevent the box-bent portion from deforming and protruding when the box-bent portion is formed; and processing the load beam material provided with the deformation control zones into the load beam having the body, slope, guided portion, and box-bent portions.

2. The method of claim 1, wherein:
the deformation control zone is a cut zone extending from a segment of an edge of the portion of the load beam material to be formed into the box-bent portion.

3. The method of claim 1, wherein:
the deformation control zone is a thinned zone extending from a segment of an edge of the portion of the load beam material to be formed into the box-bent portion.

4. The method of claim 1, wherein:
the deformation control zone is formed in a triangle shape whose base is a segment of an edge of the portion of the load beam material to be formed into the box-bent portion.

5. The method of claim 1, wherein:
the deformation control zone is formed to cross the bend line or extend on the slope side from the bend line.

6. The method of claim 1, wherein:
the deformation control zone is formed so that a difference between the height of the box-bent portion and the height of the deformation control zone is equal to or larger than 30% of the height of the box-bent portion.

7. The method of claim 1, wherein:
an angle formed between the body and the slope of the load beam is equal to or smaller than 26 degrees.

8. A load beam manufactured according to the method of claim 1.

9. A load beam manufactured according to the method of claim 2.

10. A load beam manufactured according to the method of claim 3.

11. A load beam manufactured according to the method of claim 4.

12. A load beam manufactured according to the method of claim 5.

13. A load beam manufactured according to the method of claim 6.

14. A load beam manufactured according to the method of claim 7.

15. A load beam manufactured according to the method of claim 8.

16. A load beam manufactured according to the method of claim 9.

17. A load beam manufactured according to the method of claim 10.

18. A load beam manufactured according to the method of claim 11.

19. A load beam manufactured according to the method of claim 12.

20. A load beam manufactured according to the method of claim 13.

21. A load beam manufactured according to the method of claim 14.

* * * * *